United States Patent
Childress et al.

(10) Patent No.: US 9,774,203 B2
(45) Date of Patent: Sep. 26, 2017

(54) SMART BATTERY CHARGING TO IMPROVE THE LIFESPAN OF BATTERIES

(71) Applicant: International Business Machines Corporation, Armonk, NY (US)

(72) Inventors: Rhonda L. Childress, Austin, TX (US); Kim A. Eckert, Austin, TX (US); Jente B. Kuang, Austin, TX (US); Ryan D. McNair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 15/131,141

(22) Filed: Apr. 18, 2016

(65) Prior Publication Data

US 2016/0261122 A1    Sep. 8, 2016

Related U.S. Application Data

(63) Continuation of application No. 14/640,198, filed on Mar. 6, 2015.

(51) Int. Cl.
    *H02J 7/00* (2006.01)

(52) U.S. Cl.
    CPC .......... *H02J 7/0057* (2013.01); *H02J 7/0021* (2013.01); *H02J 2007/0001* (2013.01);
    (Continued)

(58) Field of Classification Search
    CPC ......... H02J 2007/001; H02J 2007/0096; H02J 2007/0098; H02J 7/04; H02J 7/0021;
    (Continued)

(56) References Cited

U.S. PATENT DOCUMENTS

| | | |
|---|---|---|
| 5,572,110 A | 11/1996 | Dunstan |
| 6,005,367 A | 12/1999 | Rohde |

(Continued)

FOREIGN PATENT DOCUMENTS

| | | |
|---|---|---|
| DE | 102013203174 A1 | 8/2014 |
| EP | 1384086 B1 | 1/2004 |

(Continued)

OTHER PUBLICATIONS

Hussein, et al., "A Review of Charging Algorithms for Nickel and Lithium Battery Chargers", IEEE Transactions on Vehicular Technology, vol. 60, No. 3, Mar. 2011, pp. 830-838.

(Continued)

*Primary Examiner* — Nathaniel Pelton
(74) *Attorney, Agent, or Firm* — Daniel R. Simek (57) ABSTRACT

A method for managing a rechargeable battery. The method includes a computer processor identifying a rechargeable battery within a first device. The method further includes a computer processor identifying a battery maintenance policy associated with the rechargeable battery. The method further includes a computer processor determining a first set of models for implementing the identified battery maintenance policy on the identified rechargeable battery based on the identified battery maintenance policy and one or more environmental factors corresponding to the first device. The method further includes a computer processor installing the first set of models in the first device. The method further includes a computer processor performing an intervention action based, at least in part, on a current state of the first set of models and one or more current environmental factors corresponding to the first device.

1 Claim, 5 Drawing Sheets

(52) U.S. Cl.
CPC .............. *H02J 2007/0096* (2013.01); *H02J 2007/0098* (2013.01); *Y02B 40/90* (2013.01)

(58) Field of Classification Search
CPC ...... H02J 7/0057; H02J 7/0004; H02J 7/0091; H02J 7/007
USPC ...................................... 320/106; 429/50, 61
See application file for complete search history.

(56) References Cited

U.S. PATENT DOCUMENTS

| | | |
|---|---|---|
| 2011/0018679 A1 | 1/2011 | Davis et al. |
| 2012/0210325 A1 | 8/2012 | de Lind van Wijngaarden et al. |
| 2013/0116868 A1* | 5/2013 | Erko ................ B60W 10/26 701/22 |
| 2013/0207591 A1 | 8/2013 | Reineccius |
| 2013/0260188 A1* | 10/2013 | Coates ................ H01M 10/42 429/50 |
| 2014/0201120 A1 | 7/2014 | Lydon et al. |

FOREIGN PATENT DOCUMENTS

| | | |
|---|---|---|
| EP | 2700142 B1 | 2/2016 |
| WO | 2008036948 A2 | 3/2008 |
| WO | 2011135385 A3 | 11/2011 |
| WO | 2014131765 A2 | 9/2014 |

OTHER PUBLICATIONS

Zhang, et al., "The Design and Implementation of Smart Battery Management System Balance Technology", Journal of Convergence Information Technology, vol. 6, No. 5, May 2011, pp. 108-116.

"BatteryCare—Free download and software reviews—CNET Download.com", printed Dec. 10, 2014, <http://download.cnet.com/BatteryCare/3000-20430_4-10964408.html>.

"The Eliminata® Laptop Saver", Eliminata®—Energy Savers at Work—Laptop Saver, printed Dec. 10, 2014, <http://www.eliminata.com/product-laptop.html>.

"LTC4100—Smart Battery Charger Controller", Linear Technology, printed Dec. 10, 2014, <http://www.linear.com/product/LTC4100>.

"What Is a Smart Battery Charger?", wiseGEEK, printed Dec. 10, 2014, <http://www.wisegeek.com/what-is-a-smart-battery-charger-htm>.

List of IBM Patents or Patent Applications Treated as Related, Appendix P, Filed Herewith, 2 pages.

Childress, et al., U.S. Appl. No. 14/640,198, dated Mar. 6, 2015.

* cited by examiner

SMART BATTERY CHARGING TO IMPROVE THE LIFESPAN OF BATTERIES

BACKGROUND OF THE INVENTION

The present invention relates generally to the field of battery charging, and more particularly to employing smart battery charging methodologies.

Rechargeable batteries are used to provide power to a variety of electronic devices, as alternate power sources for portable electronic devices, and as a backup power source for both portable and stationary electronic devices when alternating current (AC) power is unavailable. Some electronic devices may be powered by an adapter connected to a direct current (DC) source, such as a lighter receptacle in a car. While connected to a DC power source the rechargeable batteries within the electronic device may recharge. Typical portable electronic devices that contain rechargeable batteries include smartphones, cell phones, tablet computers, laptop computers, e-readers, cameras, recording devices, mobile test equipment, and mobile medical equipment. Some rechargeable batteries are a single "cell" and other rechargeable batteries (e.g., battery packs) are sets of cells configured in a series, parallel, or a mixture of both to deliver the desired voltage, capacity, or power density.

Some portable electronic devices, such as cameras and recording devices, typically have a more uniform power consumption, and the rechargeable batteries in these devices are readily swapped out and replaced with fresh batteries. The swapped-out, rechargeable batteries can be recharged by a user as needed. Other portable electronic devices, such as smart phones and laptop computers may have highly variable power consumption. The power consumption varies by the number of options on the electronic device that are active (e.g., global positioning systems, cameras, wireless communication adapters, number of active cores, graphics accelerators, etc.), and the activity of a user. Reading a document comprised of mostly text takes significantly less power than a high-resolution video game interacting with other users over the Internet. The rechargeable batteries for some electronic devices (e.g., smartphones, laptop computers, etc.) are more expensive and less readily swapped out. In addition, various portable electronic devices are exposed to a wide variety of environmental conditions during their transport or operation. A portable electronic device, such as a laptop computer, is likely to be attached to an AC power adapter to eliminate the power drain on the rechargeable batteries within the laptop computer when a user becomes stationary for a period of time and the user has access to AC power. While attached to AC power, the portable electronic device can also recharge the rechargeable battery. In addition, when a user of a portable device, such as a laptop computer, is at home, at work, or another fixed location for an extended duration, the user may recharge the rechargeable batteries via an AC adapter while the portable device is active, "sleeping," or powered off. Portable electronic devices may contain rechargeable batteries that are smart batteries, smart charging systems within the portable device designed to operate with smart batteries, and the AC adapter itself may contain smart charging technology. Some portable electronic devices may have multiple methods to obtain power for operating and recharging. For example, a smartphone may be powered by a universal serial bus (USB) adapter or a power adapter specific to the make or model of the smartphone.

SUMMARY

According to an aspect of the present invention, there is a method, computer program product, and/or system for managing a rechargeable battery. The method includes one or more computer processors identifying a rechargeable battery within a first device. The method further includes one or more computer processors identifying a battery maintenance policy associated with the rechargeable battery. The method further includes one or more computer processors determining a first set of models for implementing the identified battery maintenance policy on the identified rechargeable battery based on the identified battery maintenance policy and one or more environmental factors corresponding to the first device. The method further includes one or more computer processors installing the first set of models in the first device. The method further includes one or more computer processors performing an intervention action based, at least in part, on a current state of the first set of models and one or more current environmental factors corresponding to the first device.

DETAILED DESCRIPTION

Embodiments of the present invention recognize that the lifespan (i.e., service life) of a rechargeable battery depends on various environmental factors, charging parameters, and the electronic device usage. Rechargeable batteries, based on certain chemistries (e.g., nickel metal-hydrides, lithium-ion), are more expensive than some older technologies (e.g., nickel-cadmium). However, nickel metal-hydrides and lithium-ion batteries have a higher energy density and provide an ergonomic advantage to portable electronic devices, such as smartphones and laptop computers. Improper charging parameters and non-optimal charging patterns adversely affect the lifespan of a rechargeable battery. Whereas fully discharging nickel-cadmium batteries may minimize "memory effects" within the rechargeable battery, fully discharging a nickel metal-hydride rechargeable battery or a lithium-ion rechargeable battery induces stresses that can damage the rechargeable battery. Heat is another environmental factor that is detrimental to the lifespan of nickel metal-hydride rechargeable batteries or lithium-ion rechargeable batteries. The source of heat affecting a rechargeable battery may be: internally generated by intensive usage of the electronic device, a battery charger that continues to trickle charge the rechargeable battery once the rechargeable battery has charged to 100% of the capacity, and charging the rechargeable battery at a normal rate when the electronic device is exposed to a higher ambient temperature. Charging some rechargeable batteries at even 0.1 volt (direct current) higher than the voltage rating of the battery can also adversely affect the lifespan of the rechargeable battery. Differences between design voltages and the actual voltage of a rechargeable battery pack may occur in response to variations in the manufacture of the rechargeable battery. The capability to identify and compensate for these voltage differences may be included within a battery maintenance policy.

Embodiments of the present invention recognize that the manufacturers of rechargeable batteries preform testing of the rechargeable batteries and develop battery maintenance policies. Battery maintenance polices may be optimized to obtain specific goals, such as fastest recharge rate or maximizing the lifespan of a rechargeable battery. Battery maintenance policies may be available from the manufacturer that produced the rechargeable battery or a different battery maintenance policy may be available from the manufacturer of the electronic device employing the rechargeable battery. The battery maintenance policy available from the manufacturer of the electronic device may be optimized for use of the rechargeable battery within that electronic device, as opposed to optimized to maximize the lifespan of the rechargeable battery. Embodiments of the present invention seek to maximize the lifespan of rechargeable batteries. For the purpose of the description herein after, the term rechargeable battery includes rechargeable battery pack.

Embodiments of the present invention also recognize that a user may not be familiar with locating a battery maintenance policy. In addition, applying the battery maintenance policy to the electronic device may not be as trivial as changing a few parameters of the electronic device. Embodiments of the present invention recognize that maximizing the lifespan of a rechargeable battery dictates that different attributes of the battery maintenance policy are implemented depending on the state of the rechargeable battery and various environmental factors. Automatically implementing the attributes of the battery maintenance policy more effectively maximizes the lifespan of a rechargeable battery than a user manually monitoring parameters and deciding when to apply the battery maintenance policy to the rechargeable battery. Some embodiments of the present invention include installing a baseline set of battery maintenance models, generated from pre-learned algorithms, on the electronic device powered by a rechargeable battery. Further embodiments of the present invention may be applied to individual battery cells within a rechargeable smart battery (e.g., battery pack) that incorporates cell balance circuits, thus compensating for manufacturing variations between battery cells within a rechargeable battery pack.

The descriptions of the various scenarios, instances, and examples related to the present invention have been presented for purposes of illustration but are not intended to be exhaustive or limited to the embodiments disclosed. Some embodiments of the present invention may be integrated as part of a microcontroller within the battery pack of a rechargeable battery. In one example, the rechargeable battery pack controls the recharging power from within the electronic device. In another example, the rechargeable battery pack controls the recharging power via an external power adapter. Different embodiments of the present invention may be implemented to support rechargeable batteries that are incorporated within electronic devices that are part of the Internet-of-Things. For example, a second electronic device, that is part of the Internet-of-Things, contains a rechargeable battery and smart charging technologies. However, the second device does not include sufficient storage and computational capabilities to locally support a set of battery maintenance models. A first electronic device, that is part of the Internet-of-Things, has sufficient resources to support a set of battery maintenance models. The first electronic device and the second electronic device communicate with each other allowing the first electronic device to apply the actions prescribed by the set of battery maintenance models of the second electronic device to the second electronic device as required.

Figure 1:
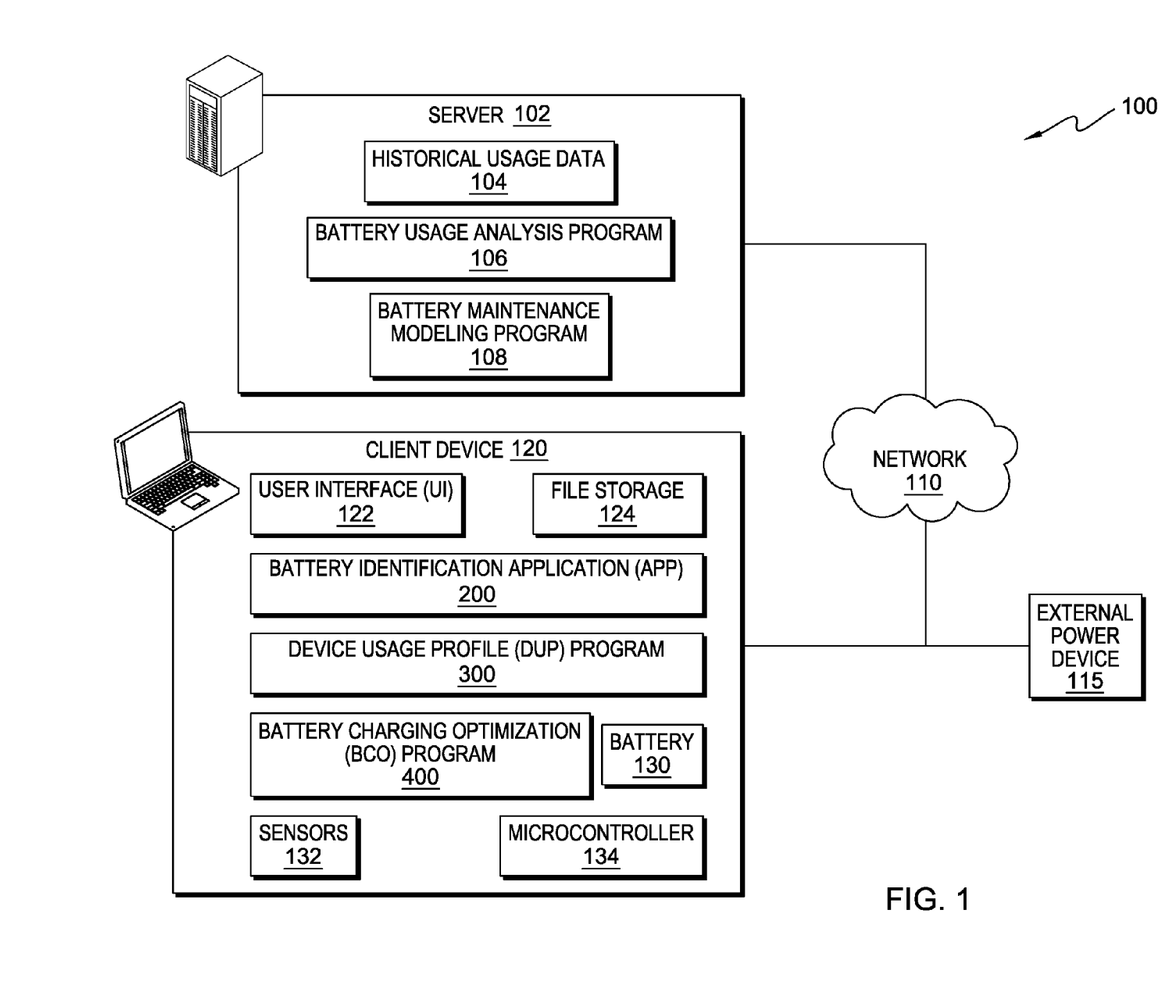
FIG. 1 illustrates a distributed data processing environment, in accordance with an embodiment of the present invention.

The present invention will now be described in detail with reference to the Figures. FIG. 1 is a functional block diagram illustrating distributed data processing environment 100 in an embodiment, in accordance with the present invention. An embodiment of distributed data processing environment 100 includes server 102, external power device 115, and client device 120 interconnected over network 110. Many modifications to the depicted environment may be made by those skilled in the art without departing from the scope of the invention as recited by the claims.

Server 102 may be a laptop computer, a tablet computer, a netbook computer, a personal computer (PC), a desktop computer, a personal digital assistant (PDA), a smart phone, or any programmable computer system known in the art. In certain embodiments, server 102 represents a computer system utilizing clustered computers and components (e.g., database server computers, application server computers, etc.) that act as a single pool of seamless resources when accessed through network 110, as is common in data centers and with cloud-computing applications. In general, server 102 is representative of any programmable electronic device or combination of programmable electronic devices capable of executing machine readable program instructions and communicating with client computers, such as client device 120 and electronics devices, such as external power device 115, via network 110. Server 102 may include components, as depicted and described in further detail with respect to FIG. 5, in accordance with embodiments of the present invention.

Server 102 includes historical usage data 104, battery usage analysis program 106, battery maintenance modeling program 108, and various programs (not shown). In some embodiments, server 102 contains a database of information on rechargeable batteries of various manufactures and the associated battery maintenance policies. In other embodiments, server 102 supports the manufacturer of a rechargeable battery. Some battery maintenance policies, derived by manufacturers of rechargeable batteries, maximize the lifespan of a rechargeable battery.

In one embodiment, historical usage data 104 contains filtered and anonymized usage data associated with battery 130, which powers client device 120. In some scenarios, server 102 receives instances of historical usage data 104 from a plurality of users, which includes: data on a periodic basis, data associated with a state of battery 130, environmental factors, and power consumption of the respective client device 120 of the plurality of users. In another embodiment, server 102 registers battery 130 to a specific user and instance of client device 120 (e.g., in historical usage data 104. Historical usage data 104 receives data from the user of client device 120 on a periodic basis. The data received by historical usage data 104 is comprised of battery states associated with battery 130, environmental factors that battery 130 experiences, and various power consumption levels of client device 120. In some embodiments, historical usage data 104 may also contain observed behaviors of a user of client device 120. In other embodiments, historical usage data 104 contains observed behaviors of a plurality of users that utilize an electronic device powered by another battery 130.

Battery usage analysis program 106 stores information associated with one or more states of battery 130, environmental factors affecting battery 130, usage information for client device 120, and behaviors of a user of client device 120 within historical usage data 104. In one embodiment, battery usage analysis program 106 employs various analytical methods to determine patterns of use of client device 120 and behavior patterns associated with a user of client device 120. In further embodiments, battery usage analysis program 106 develops predictive (e.g., likelihood) algorithms to anticipate which behaviors or sequences of behaviors (e.g., client device 120 is used, client device 120 is attached to an AC power adapter, etc.) of a user occur under what conditions (e.g., date, day of the week, time of the day, etc.). Predictive algorithms can include a level of uncertainty associated with the predictions so the predictive algorithms also provide a threshold of range of times or actions to address the uncertainty factor. For example, battery usage analysis program 106 determines that during a particular time span, Monday through Friday, nominally from 8:00 AM to 5:00 PM, a user employs client device 120 and that client device 120 is usually connected to an AC power adapter. However, during this period, there is a one-hour window with minimal usage of client device 120 and that one-hour window usually occurs between 11:00 AM and 1:00 PM. Periodic review of stored behaviors of a user provides feedback to battery usage analysis program 106. Battery usage analysis program 106 uses on-line learning to determine that exceptions to this pattern of behavior are strongly influenced by the month of the year (e.g., no usage during holidays) and randomly occur (e.g., vacations). In addition, some embodiments apply machine learning and reinforced learning techniques to parametric data, environmental factors, and other information obtained from historical usage data 104 to refine the likelihood algorithms and the subsequent effects on battery maintenance models and the associated interventions generated by the battery maintenance models on client device 120. In another embodiment, battery usage analysis program 106 is installed on client device 120 and historical usage data 104 for the user of client device 120 is stored in file storage 124. In this other embodiment, battery usage analysis program 106 utilizes various statistical modeling programs (not shown) and machine learning programs (not shown) on server 102. Battery usage analysis program 106 may access the historical usage data 104 for a user of client device 120 in file storage 124 and that of other users in historical usage data 104. Battery maintenance modeling program 108 may also be installed on client device 120. In one scenario, battery maintenance modeling program 108 interfaces with battery usage analysis program 106 while client device 120 is active. In another scenario, battery maintenance modeling program 108 activates on client device 120 when server 102 is not available (e.g., when connectivity via network 110 is lost).

In some embodiments, battery usage analysis program 106 may identify users by groups. The groups can represent, for example, statistically similar usage patterns of users that have electronic devices powered by other instances of battery 130. In one scenario, battery usage analysis program 106 may chart usage patterns and rank the usage patterns relative to a level of compliance associated with a battery maintenance policy that maximizes the lifespan of battery 130. In another scenario, battery usage analysis program 106 includes an indication of a "level of compliance" demonstrated by the user of client device 120 based on a relative compliance chart associated the battery maintenance policy for battery 130. The level of compliance chart may include an estimated lifespan for battery 130 for each compliance level. In some scenarios, battery usage analysis program 106 may provide a user of client device 120 an estimated remaining lifespan for battery 130, where the estimated remaining lifespan includes a time duration and one or more statistic. For example, battery usage analysis program 106 may indicate that battery 130, powering client device 120, has a 10% probability of failure within two months and a 50% probability of failure within six months.

In other embodiments, battery usage analysis program 106 downloads information (e.g., states of battery 130, operational history of battery 130, etc.) to client device 120 via network 110. The download information is stored in file storage 124. In one scenario, the information is a separate file that may be read by the user of client device 120 via a word-processing program. In another scenario, a user of client device 120 may access the downloaded information from battery usage analysis program 106 via an option within User Interface (UI) 122. For example, the downloaded information presented by UI 122 may include, the initial max power level (e.g., operational time) of battery 130 and the charging duration, the current max power level (e.g., operational time) of battery 130 and the charging duration, a level of compliance, and estimated remaining lifespan information for battery 130. The information associated with battery 130 may be text based or presented in a graphical format, such as dashboard gauges.

Battery maintenance modeling program 108 generates a set of models for implementing battery maintenance policies based on battery maintenance policies and various environmental factors affecting battery 130. Battery maintenance modeling program 108 extracts environmental factors and other information specific to client device 120 from historical usage data 104. In one embodiment, battery maintenance modeling program 108 employs off-line learning employing training sets (e.g., datasets) to generate the initial (e.g., baseline) set of models for implementing battery maintenance policies determined by the manufacturer of battery 130. Subsequently, validation or updates to a set of battery maintenance models may occur as data associated with the behavior of battery 130 is aggregated from a plurality of users employing electronic devices powered by battery 130. In this embodiment, battery maintenance modeling program 108 generates a set of battery maintenance models for an average user of an electronic device powered by battery 130. In another embodiment, battery maintenance modeling program 108 tailors a set of battery maintenance models to a specific electronic device (e.g., client device 120).

Further embodiments incorporate analytics and on-line learning to study the behavior patterns of a user of client device 120 and the battery usage of client device 120, providing a set of battery maintenance models that are optimized (e.g., personalized) for battery 130 powering client device 120. For example, an optimized set of battery maintenance models for a user that employs client device 120 as a primary workstation and employs multiple screen and graphic intensive applications may not perform as well for a user that is frequently mobile and interacts with other users via wireless networks. In some embodiments, battery maintenance modeling program 108 includes logical operations that trigger intervention actions based on the current state of battery 130 and one or more current environmental factors. Intervention actions include, but are not limited to: restricting the recharging rate until the temperature of battery 130 achieves a lower temperature, delaying the shut-down of client device 120, modifying one or more power management settings, modifying the operating mode (e.g., sleep, hibernate, restart, etc.) of client device 120, and limiting the charge level of battery 130 during specified periods of time. In one scenario, battery maintenance modeling program 108 generates a set of battery maintenance models that performs an intervention without actions from a user of client device 120. In another scenario, battery maintenance modeling program 108 generates a set of battery maintenance models that includes actions that require the user of client device 120 to perform an intervention to maximize a level of compliance with the battery maintenance policy for battery 130. For example, a battery maintenance model may output a message, via UI 122, to a user of client device 120 to leave client device 120 connected to an AC power adapter for at least 30 minutes after powering down client device 120.

In a different embodiment, battery maintenance modeling program 108 is installed on client device 120, and historical usage data 104 for the user of client device 120 is stored in file storage 124. In this embodiment, battery maintenance modeling program 108 utilizes various statistical modeling programs (not shown) and machine learning programs (not shown) on server 102. Battery maintenance modeling program 108 may access the historical usage data 104 for a user of client device 120, in file storage 124, and that of other users in historical usage data 104. Battery usage analysis program 106 may also be installed on client device 120. In one scenario, battery maintenance modeling program 108 interfaces with battery usage analysis program 106 while client device 120 is active. In another scenario, battery usage analysis program 106 activates on client device 120 when server 102 is not available (e.g., when connectivity via network 110 is lost).

In one embodiment, client device 120, external power device 115, and server 102 communicate through network 110. Network 110 can be, for example, a local area network (LAN), a telecommunications network, a wireless local area network (WLAN), a wide area network (WAN) such as the Internet, or any combination of the previous, and can include wired, wireless, or fiber optic connections. In general, network 110 can be any combination of connections and protocols that will support communications between client device 120 and server 102, in accordance with embodiments of the present invention. In another embodiment, network 110 operates locally via wired, wireless, or optical connections and can be any combination of connections and protocols (e.g., near filed communication (NFC), laser, infrared, etc.).

External power device 115 may be a smart AC power adapter for client device 120. In one embodiment, communication with external power device 115 occurs via a cable that supplies electrical power to client device 120. In another embodiment, external power device 115 communicates with client device 120 locally, via wired, wireless, or optical connections and can be any combination of connections and protocols (e.g., NFC, laser, infrared, etc.). In some embodiments, external power device 115 is a stand-alone charger for a rechargeable battery. In one scenario, external power device 115 is specifically designed to recharge battery 130 of client device 120. In another scenario, external power device 115 detects the identification of the rechargeable battery or an electronic product code (EPC) associated with the rechargeable battery and may communicate with server 102 via network 110. In one instance, the EPC associated with a rechargeable battery is identified via a radio-frequency identification (RFID) tag embedded within battery 130. In another instance, the EPC associated with a rechargeable battery is identified via additional electrical connections on battery 130, such as the data line on a system management bus (SMBus) connector.

Client device 120 may be a personal computer (PC), a smart phone, a tablet computer, a netbook computer, a personal digital assistant (PDA), a wearable device (e.g., digital eyeglasses, smart glasses, smart watches), a laptop computer, or any programmable computer system operating utilizing wired or wireless network communications (e.g., WAN, laser, infrared, etc.) known in the art. In general, client device 120 is representative of any programmable electronic device or combination of programmable electronic devices capable of executing machine readable program instructions and communicating with computers, such as server 102 via network 110. Client device 120 may include components, as depicted and described in further detail with respect to FIG. 5, in accordance with embodiments of the present invention.

Client device 120 includes user interface (UI) 122, file storage 124, battery 130, sensors 132, microcontroller 134, battery identification application (app) 200, device usage profile (DUP) program 300, battery charging optimization (BCO) program 400, a web browser (not shown), and various programs (not shown). A user of client device 120 can interact with UI 122 via a singular device, such as a touch screen (e.g., display) that performs both input to a graphical user interface (GUI) and as an output device (e.g., a display) presenting a plurality of icons associated with software applications or images depicting the executing software application. Optionally, a software application (e.g., battery identification app 200, BCO program 400, a web browser, etc.) can generate UI 122, operating within the GUI of client device 120.

UI 122 accepts input from a plurality of input/output (I/O) devices (not shown) including, but not limited to, a tactile sensor interface (e.g., a touch screen, a touchpad) or a natural user interface (e.g., voice control unit, motion capture device, etc.). An I/O device interfacing with UI 122 may be connected to client device 120 which may operate utilizing wired (e.g., USB port) or wireless network communications (e.g., infrared, NFC, etc.). For example, an I/O device may be a peripheral, such as a keyboard, a mouse, a trackball, and a click wheel that provide input from a user. In some embodiments, client device 120 includes an external power adapter. For example, the external power adapter may be an AC power adapter, or the external power adapter may be a DC power adapter. For example, a DC power adapter may be connected to another electronic device via a USB connection or connected to a lighter receptacle in a motor vehicle.

Battery 130 is a rechargeable battery that powers client device 120. Battery 130 is a smart battery that contains a battery management system (BMS). A BMS monitors the state of a battery. A BMS may also include computational capabilities, communication links, protection circuits, and optimization capabilities (e.g., cell balancers). In one embodiment, information is stored on one or more integrated circuits incorporated within battery 130. In one scenario, battery 130 is charged by a smart charger (e.g., microcontroller 134) included within client device 120. In another scenario, battery 130 is charged by a smart charger included in external power device 115. For example, battery 130 may be an external battery that connects to the USB port of client device 120 to extend the operational time of client device 120. In this example, battery 130 may be charged independent of client device 120.

Sensors 132 include devices that determine various environmental factors and operating parameters. Environmental factors and operating parameters include temperature of client device 120, temperature of battery 130, current flowing in or out of battery 130, barometric pressure, humidity, pressure within cells of battery 130, voltage of battery 130, charging voltage, etc.

Microcontroller 134 is associated with a smart charging system. In one embodiment, microcontroller 134 is a smart charging system within client device 120. In another embodiment, microcontroller 134 is a smart charging system incorporated within battery 130. In yet another embodiment, microcontroller 134 is a smart charging system within external power device 115. In some embodiments, microcontroller 134 includes components (e.g., persistent storage) that store information and respond to battery states, sensor data, environmental parameters, and commands. In one scenario, microcontroller 134 contains sufficient data storage to store a set of battery maintenance models and battery maintenance policies. In another scenario, microcontroller 134 has limited persistent storage and may store a battery maintenance policy; however, microcontroller 134 communicates with client device 120 to obtain information and interventions associated with a set of battery maintenance models.

Figure 2:
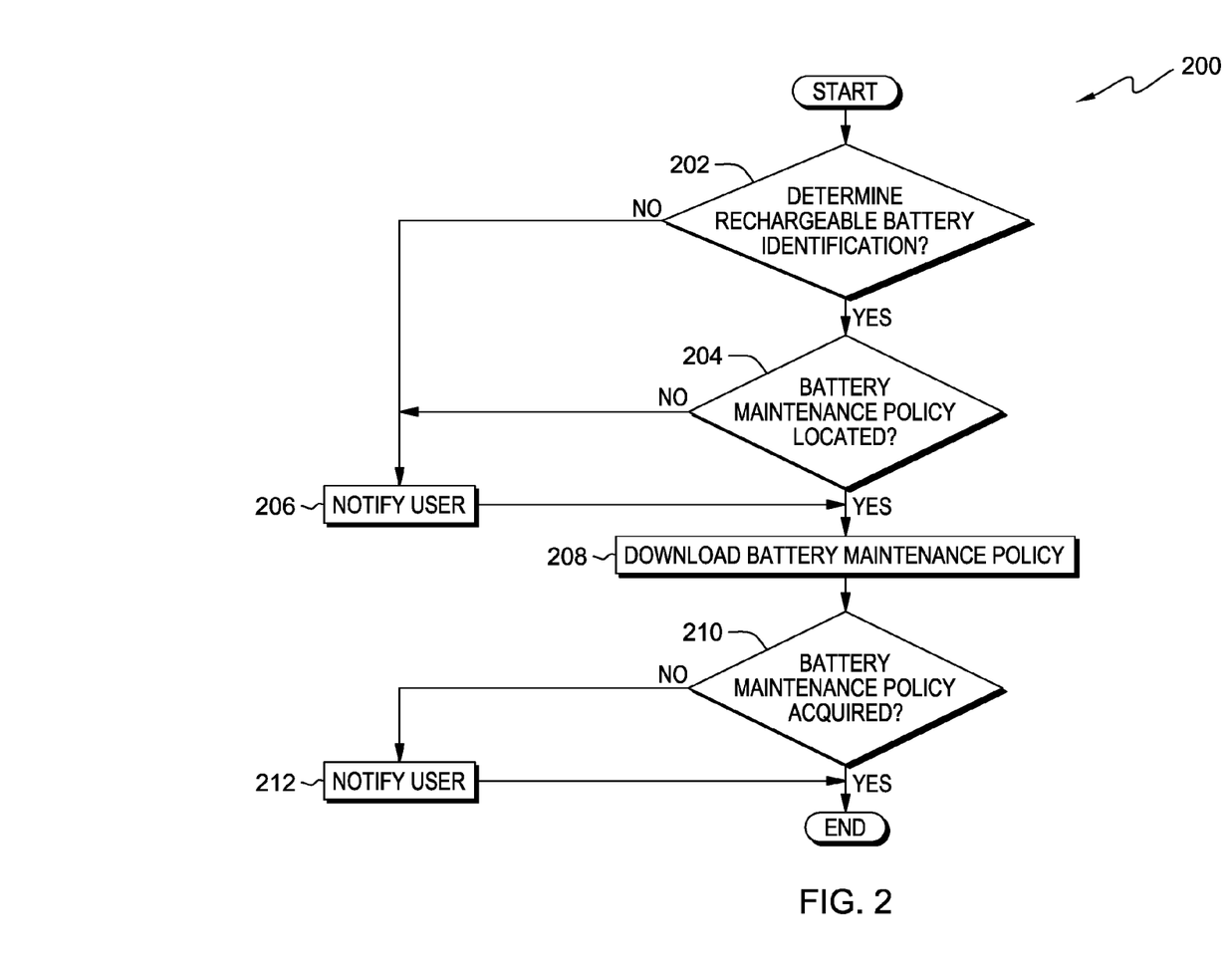
FIG. 2 depicts a flowchart of the steps of a battery identification application, in accordance with an embodiment of the present invention.

Battery identification application (app) 200 determines the identification information of battery 130, locates a battery maintenance policy for battery 130, and downloads the battery maintenance policy for battery 130 to client device 120. In some embodiments, battery identification app 200 utilizes input from the user of client device 120 to perform one or more action to acquire the battery maintenance policy that battery identification app 200 cannot automatically perform.

Figure 3:
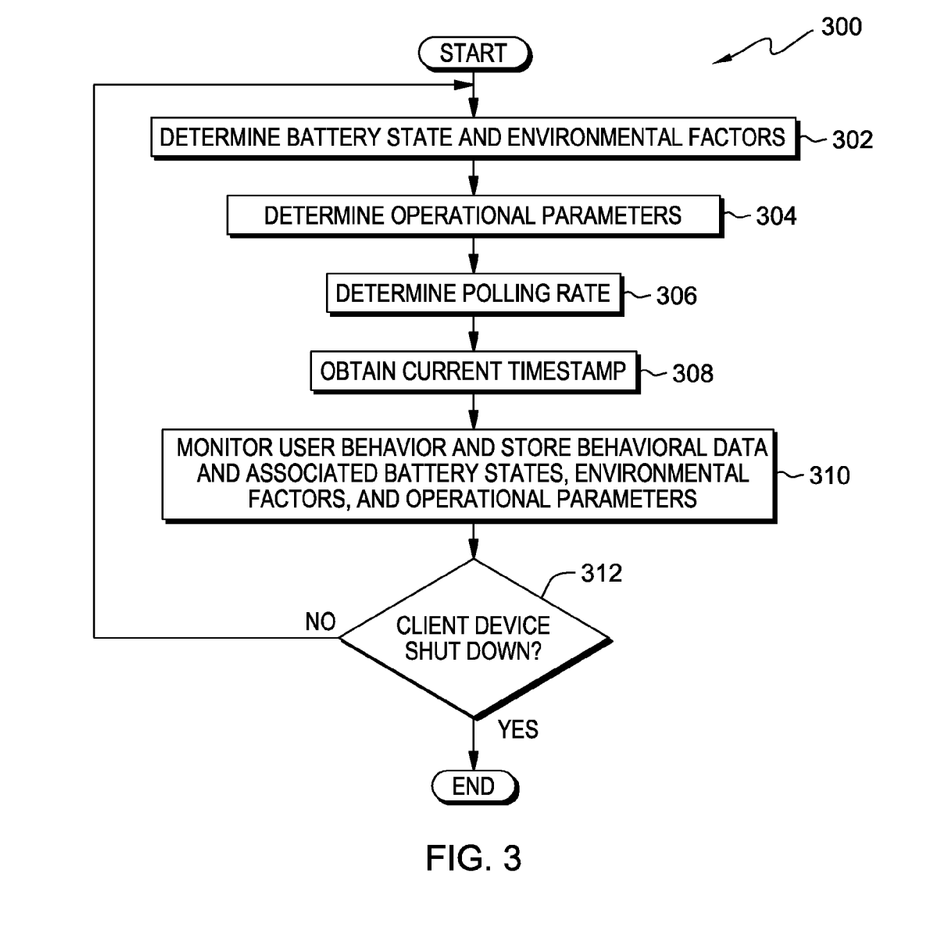
FIG. 3 depicts a flowchart of the steps of a device usage profile program, in accordance with an embodiment of the present invention.

Device usage profile (DUP) program 300 monitors, during the operation of client device 120, states of battery 130, environmental factors, operational characteristics of client device 120 (e.g., active options, power source, connected I/O devices, etc.), and behaviors of a user of client device 120. In one embodiment, DUP program 300 stores the monitored states of battery 130, environmental factors, operational characteristics of client device 120, and behaviors of a user of client device 120 in file storage 124. In one scenario, client device 120 does not have a set of battery maintenance models associated with the battery maintenance policy for battery 130. DUP program 300 monitors client device 120 at a faster polling rate and uploads the monitored data more frequently to battery usage analysis program 106 on server 102 while battery maintenance modeling program 108 generates a set of battery maintenance models for battery 130 powering client device 120. In another scenario, DUP program 300 stores the monitored data in file storage 124 on client device 120. DUP program 300 delays uploading the stored monitored data until the next time that client device 120 is activated.

Figure 4:
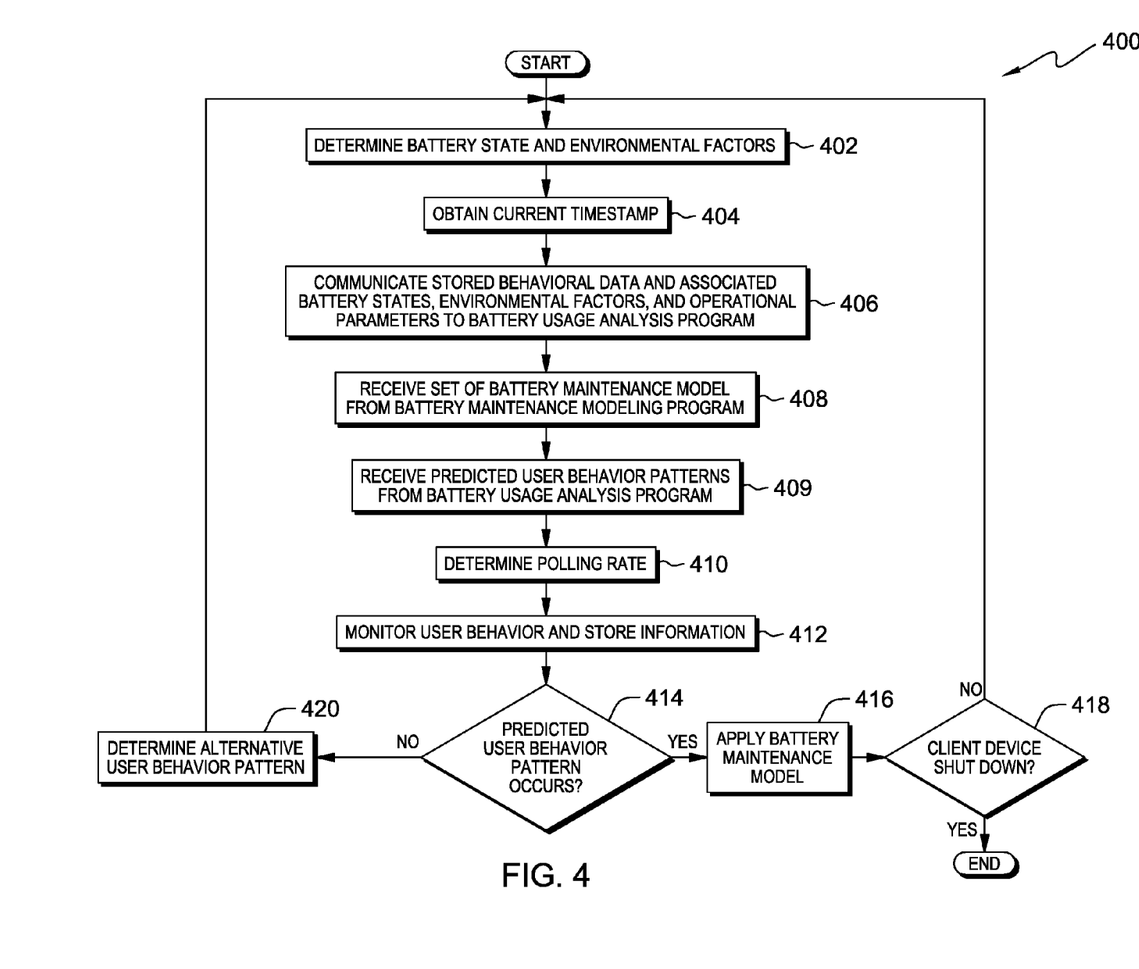
FIG. 4 depicts a flowchart of the steps of a battery charge optimization program, in accordance with an embodiment of the present invention.

Battery charging optimization (BCO) program 400 receives a set of battery maintenance models, from battery maintenance modeling program 108 executing on server 102, based on a battery maintenance policy for battery 130 that maximizes the lifespan of battery 130 and information extracted from historical usage data 104. BCO program 400 stores the received set of battery maintenance models in file storage 124. Subsequently, BCO program 400 installs the set of battery maintenance models on client device 120. BCO program 400 may execute concurrently with DUP program 300 on client device 120. In one embodiment, BCO program 400 receives a stable set of battery maintenance models for battery 130 and determines responses from the stable set of battery maintenance models from various states of battery 130, environmental factors experienced by battery 130, and current behavior patterns and historical behavior patterns of a user of client device 120. In another embodiment, BCO program 400 responds to a set of battery maintenance models that is in a stage of optimization for client device 120. BCO program 400 communicates with server 102 on a periodic basis (e.g., polling rate) to transmit data to battery usage analysis program 106 and receives responses or receives an updated set of battery maintenance models from battery maintenance modeling program 108. In some embodiments, BCO program 400 checks to verify that a user of client device 120 is behaving as predicted.

FIG. 2 is a flowchart depicting operational steps for battery identification app 200 executing on client device 120. In some embodiments, battery identification app 200 determines the identity of battery 130 powering client device 120 and acquires a battery maintenance policy from an external source. In other embodiments, battery identification app 200 utilizes varying degrees of user intervention.

In decision step 202, battery identification app 200 determines an identification associated with battery 130. If battery identification app 200 determines an identification for battery 130 (yes branch, decision step 202), then battery identification app 200 searches for a battery maintenance policy associated with the battery identification of battery 130. In one embodiment, battery identification app 200 determines the identification for battery 130 via a smart battery function. For example, accessing information stored on battery 130 via a SMBus within client device 120. In one scenario, the identification information associated with battery 130 is in the form of an EPC. In another scenario, the identification information associated with battery 130 is text based (e.g., human readable, encoded in ASCII format, etc.). For example, the identification associated with battery 130 may comprise the name of the manufacturer, a URL for the manufacturer, a model number, a part number (PN:), a stock keeping unit number (SKU#), a serial number (SN:), and a date of manufacture. In another embodiment, battery identification app 200 determines the identification information associated with battery 130 by reading an RFID tag embedded within battery 130. For example, battery identification app 200 may employ a wireless communication method (e.g., WLAN, NFC, etc.).

In decision step 204, battery identification app 200 attempts to locate a battery maintenance policy for battery 130. If battery identification app 200 locates a battery maintenance policy for battery 130 (yes branch, decision step 204), then battery identification app 200 downloads a battery maintenance policy for battery 130 to client device 120. In an embodiment, battery identification app 200 locates, via network 110, a battery maintenance policy for battery 130 at a specific location (e.g., URL) contained within the identification information obtained from battery 130. In one scenario, battery identification app 200 executes a web browser accessing the URL, associated with the identification information obtained from battery 130, that contains a link that automatically download an electronic file containing the battery maintenance policy for battery 130. In another scenario, battery identification app 200 executes a web browser accessing the URL, associated with the identification information obtained from battery 130, which accesses a file transfer protocol (FTP) website containing a list of files, including a battery maintenance policy for battery 130 that may be downloaded.

Referring to decision step 202, if battery identification app 200 cannot determine an identification associated with battery 130 (no branch, decision step 202), then battery identification app 200 notifies the user of client device 120, via UI 122 that battery identification app 200 was unable to automatically determine the identification associated with battery 130. In one embodiment, the identification information associated with battery 130 is stored on battery 130, but the information is not accessible by battery identification app 200. However, the identification information for battery 130 is accessible via another program or system function. In one example, the identification information for battery 130 may be accessible, via the GUI of client device 120, through the power management function (not shown) or a control panel (not shown) option. In another example, the identification information for battery 130 may be displayed within the system information (e.g., a BIOS parameter) assessable during the boot up of client device 120. In another embodiment, the identification information associated with battery 130 is not stored on battery 130. The identification information for battery 130 may be printed on a label attached to battery 130, which is subsequently input to UI 122 or a web browser to access a location containing a battery maintenance policy for battery 130.

Referring to decision step 204, if battery identification app 200 cannot locate a battery maintenance policy for battery 130 (no branch, decision step 202), then battery identification app 200 notifies the user of client device 120, via UI 122, that battery identification app 200 was unable to automatically locate a battery maintenance policy for battery 130. In one embodiment, identification information associated with battery 130 does not direct battery identification app 200 to a specific URL that contains the battery maintenance policy for battery 130. For example, the URL contained within the identification information, obtained from battery 130, accesses a website listing the laptop batteries produced by a manufacturer. However, the URL does not directly access the battery maintenance policy for battery 130. In another embodiment, identification information associated with battery 130 does not direct battery identification app 200 to a URL associated with manufacturer of battery 130, and the URL directs battery identification app 200 to a website associated with client device 120. For example, the manufacturer of client device 120 optimized battery maintenance policies for a given combination of models of client device 120 and manufacturers of battery 130.

In step 206, battery identification app 200 notifies a user of client device 120 that at least one intervention by the user is needed. In some embodiments, battery identification app 200 has access to information but cannot provide the information to a webpage, interact with a webpage, or navigate through webpages without the intervention of a user of client device 120. In one scenario, battery identification app 200 indicates that a user of client device 120 provides the intervention via a web browser. In another scenario, battery identification app 200 indicates that a user of client device 120 provides the intervention via UI 122. In other embodiments, battery identification app 200 cannot access information (e.g., battery identification, battery maintenance policy, etc.) associated with battery 130. In some scenarios, a user of client device 120 obtains the information associated with battery 130 via other programs and functions on client device 120.

In step 208, battery identification app 200 downloads a battery maintenance policy for battery 130 to client device 120. Battery identification app 200 stores the downloaded battery maintenance for battery 130 in file storage 124 on client device 120. In some embodiments, battery identification app 200 downloads a battery maintenance policy for battery 130 from server 102. In other embodiments, battery identification app 200 downloads a battery maintenance policy for battery 130 from another location accessible via network 110. In one embodiment, battery identification app 200 automatically downloads the battery maintenance policy for battery 130 to client device 120. In another embodiment, battery identification app 200 requires the intervention of a user to download the battery maintenance policy for battery 130 to client device 120. For example, battery identification app 200 waits for a user to select the battery maintenance policy for battery 130. Subsequently, the download of the battery maintenance policy for battery 130, to client device 120, proceeds without further user intervention.

In a different embodiment, battery identification app 200 determines that microcontroller 134 implements the battery maintenance policy for battery 130. In one scenario, battery identification app 200 determines that microcontroller 134 contains limited persistent memory and only stores the battery maintenance policy on microcontroller 134. In one scenario, battery identification app 200 determines that microcontroller 134 contains sufficient persistent memory store a set of battery maintenance models based on the battery maintenance policy for battery 130.

In decision step 210, if battery identification app 200 acquires (e.g., downloads) a battery maintenance policy for battery 130 (yes branch, decision step 210), then battery identification app 200 terminates execution.

In decision step 210, if battery identification app 200 does not acquire a battery maintenance policy for battery 130 (no branch, decision step 210), then battery identification app 200 notifies a user, via UI 122, that additional user intervention is needed.

In step 212, battery identification app 200 provides a notification to a user. In some scenarios, battery identification app 200 accesses a website associated with battery 130 that battery identification app 200 cannot automatically navigate. Battery identification app 200 notifies a user of client device 120 that user intervention is needed to navigate to a webpage containing access to a battery maintenance policy for battery 130. In one example, a user navigates multiple links (e.g., customer support, laptop batteries, downloads, PN# for battery 130) prior to initiating the download of a battery maintenance policy for battery 130. In another example, the user of client device 120 employs a search function within the website of the manufacturer of battery 130 to locate and subsequently download the battery maintenance policy of battery 130 to client device 120. Subsequently, battery identification app 200 stores the manually acquired battery maintenance policy in file storage 124.

FIG. 3 is a flowchart depicting operational steps for device usage profile (DUP) program 300 executing on client device 120. DUP program 300 monitors client device 120 and behaviors of the user of client device 120. Included in the monitoring of client device 120 are states associated with battery 130 and environment factors experienced by battery 130 during the operation of client device 120. DUP program 300 may execute concurrently with BCO program 400 on client device 120. In some embodiments, DUP program 300 preferentially executes prior to BCO program 400 installing one or more sets of battery maintenance models on client device 120.

In step 302, DUP program 300 determines the state of battery 130 and the environmental factors associated with the operation of client device 120 that affect battery 130. States associated with battery 130 include open circuit voltage (OCV), open circuit voltage at rest (OCVREST), charging rate, individual cell voltages, charging current, and charging voltage. In some embodiments, DUP program 300 estimates or calculates some states associated with battery 130. Examples of estimated or calculated battery states of battery 130 include state of charge (SOC), internal resistance, depth of discharge (DOD), coulombic efficiency (CE), state of health (SOH), and total number of cycles. Other battery states may be preset or associated with the design of battery 130. For example, DUP program 300 can preset or associate battery states with the design of battery 130 include temperature cut off (TCO), minimum cell voltage, charge current limit (CCL), date of installation, and discharge current limit (DCL). Environmental factors which may affect the performance of client device 120 and battery 130 include ambient temperature, humidity, barometric pressure, ambient light levels, and motion of client device 120.

In step 304, DUP program 300 determines the operational parameters associated with client device 120. Operational parameters associated with client device 120 include time of day, power source (e.g., external power adapter, second internal battery, external battery), power management setting (e.g., number of active processor cores, clock speed, turbo boost mode, timing of sleep mode, timing of display power-off, etc.), attached peripherals, communication methods, communication speed, number and type of software applications executing, display type (e.g., internal, external), and software executing and the resources used by the executing software.

In step 306, DUP program 300 determines a polling rate that is applied to monitoring client device 120 and behaviors of the user of client device 120. The polling rate is the frequency at which DUP program 300 collects data from client device 120, battery 130, and sensors 132. Examples of data that DUP program 300 collects data from client device 120, battery 130, and sensors 132 are operational parameters, battery states, and environmental factors. Additionally, DUP program 300 polls client device 120 to collect data related to one or more behaviors associated with a user utilizing client device 120. User behaviors may include: when client device 120 is active, when a user activates specific programs, when the user utilizes client device 120 without a power adapter, when a user deactivates the display of client device 120 and utilizes and displays external to client device 120, etc. In one embodiment, the polling rate employed by DUP program 300 varies. In one scenario, DUP program 300 sets a faster polling rate when the present invention is initially installed on client device 120 to generate a large amount of information that battery usage analysis program 106 analyzes to produce predictive models. In another scenario, DUP program 300 increases the polling rate whenever a user engages in a pattern of behavior that was not previously predicted by a model generated by battery usage analysis program 106.

In another embodiment, DUP program 300 monitors the behavior of a user of client device 120 at a fixed polling rate. In one scenario, DUP program 300 sets the polling rate to the same value each time client device 120 powers on. In another scenario, DUP program 300 sets the polling rate based on information determined in step 302 and step 304 when DUP program 300 initializes. In some embodiments, DUP program 300 employs multiple polling rates. For example, DUP program 300 may set the value for a polling rate associated with one or more battery states determined in step 302. Subsequently, DUP program 300 sets different value for the polling rate associated with acquiring operational parameters (in step 304). DUP program 300 may set yet another value for a polling rate associated with monitoring behaviors of a user.

In other embodiments, DUP program 300 and BCO program 400 operate concurrently and may affect how polling rates are determined. In one scenario, DUP program 300 and BCO program 400 may synchronize polling rates for information common to DUP program 300 and BCO program 400. In another scenario, other factors determine whether polling rates determined by DUP program 300 take precedence over polling rates set by BCO program 400. For example, where models are initially developed, polling rates set by DUP program 300 take precedence over polling rates set by BCO program 400. Subsequently, when the models employed by BCO program 400 are stable, polling rates determined by BCO program 400 take precedence over polling rates determined by DUP program 300.

In step 308, DUP program 300 obtains a current time stamp from the system clock (not shown) of client device 120. In one embodiment, the current time stamp is applied to the information determined in step 302 and step 304. In another embodiment, DUP program 300 obtains a current time stamp for each group of information associated with different polling rates, and the current time stamp is respectively applied to the information determined in step 302 and step 304. DUP program 300 may also use time stamps to determine the duration of events or the duration that a battery state or operational parameter maintains prior to changing to a new battery state or a new operational parameter.

In step 310, DUP program 300 monitors behaviors of a user employing client device 120 and subsequently stores the behavioral data of the user and associated battery states, environmental factors, and operational parameters. In one embodiment, DUP program 300 stores the behavioral data and associated battery states, environmental factors, and operational parameters as a block of information in file storage 124 for subsequent transmission to battery usage analysis program 106. In another embodiment, DUP program 300 respectively assigns a second time stamp or assigns a calculated duration for each user behavior, battery state, and operational parameter. Subsequently, DUP program 300 stores the user behavior, battery state, operational parameter, and respectively applied time stamps and calculated durations in file storage 124 prior to transmission to battery usage analysis program 106 executing on server 102.

In decision step 312, DUP program 300 determines whether client device 120 is in the process of shutting down. If DUP program 300 determines that client device is active (no branch, decision step 312), then DUP program 300 loops to step 302 at a frequency dictated by a polling rate.

In decision step 312, if DUP program 300 determines that client device 120 is shutting down (yes branch, decision step 312), then DUP program 300 terminates execution.

FIG. 4 is a flowchart depicting operational steps for battery charging optimization (BCO) program 400, executing on client device 120. BCO program 400 may execute concurrently with DUP program 300. In some embodiments, some portions of BCO program 400 are inactive until sufficient information is aggregated by DUP program 300 and transmitted to server 102, such that battery maintenance modeling program 108 may generate a set of battery maintenance models for client device 120 powered by battery 130, and the set of models is installed on client device 120.

In step 402, BCO program 400 determines the state of battery 130 and the environmental factors associated with the operation of client device 120 that affect battery 130. States associated with battery 130 include open circuit voltage (OCV), open circuit voltage at rest (OCVREST), charging rate, individual cell voltages, charging current, and charging voltage. In one embodiments, BCO program 400 estimates and calculates some states associated with battery 130. Examples of estimated or calculated battery states of battery 130 include state of charge (SOC), internal resistance, depth of discharge (DOD), coulombic efficiency (CE), state of health (SOH), and total number of cycles. Other battery states may be preset or associated with the design of battery 130. For example, BCO program 400 can preset or associate battery states with the design of battery 130 including temperature cut off (TCO), minimum cell voltage, charge current limit (CCL), date of installation, and discharge current limit (DCL). Environmental factors, which may affect the performance of client device 120 and battery 130, include ambient temperature, humidity, barometric pressure, ambient light levels, and motion of client device 120. BCO program 400 can determine the environmental factors utilizing sensors 132 or other functions associated with client device 120. In one embodiment, BCO program 400 temporarily stores state of battery 130 and the environmental factors associated with the operation of client device 120 that affect battery 130 in volatile storage (e.g., random access memory (RAM)). In another embodiment, BCO program 400 stores state of battery 130 and the environmental factors associated with the operation of client device 120 that affect battery 130 in persistent storage (e.g., in file storage 124.)

In step 404, BCO program 400 obtains a current time stamp from the system clock (not shown) of client device 120. In one embodiment, the current time stamp is applied to the battery state and environmental factor information determined in step 402. In another embodiment, BCO program 400 obtains a current time stamp for each group of information associated with different polling rates, and the current time stamp is respectively applied to the information determined in step 402. BCO program 400 may also use timestamps to determine the duration of events or the duration that a battery state or operational parameter maintains prior to changing to a new battery state or a new operational parameter.

In step 406, BCO program 400 communicates behavioral data and associated battery states, environmental factors and operational parameters stored in file storage 124 to battery usage analysis program 106. In one embodiment, BCO program 400 communicates (e.g., transmits) information, stored in file storage 124, that is associated with user behavior, operational parameters of client device 120, and battery states of battery 130 when BCO program 400 activates. In other embodiments, BCO program 400 communicates information that is associated with user behavior, operational parameters of client device 120, and battery states of battery 130 based on a polling rate. In one scenario, BCO program 400 communicates stored information with battery usage analysis program 106 at a single polling rate. In another scenario, BCO program 400 communicates stored information with battery usage analysis program 106 at a polling rate associated with the source of the information (e.g., user behaviors, battery states of battery 130, operational parameters of client device 120.)

In step 408, BCO program 400 receives a set of battery maintenance models from battery maintenance modeling program 108. BCO program 400 subsequently saves the set of battery maintenance models in file storage 124. In one embodiment, BCO program 400 receives a set of battery maintenance models for each user of client device 120. When BCO program 400 receives another set of battery maintenance models for a user, BCO program 400 replaces the previous set of models for that user in file storage 124. In another embodiment, BCO program 400 creates a library of sets of battery maintenance models in file storage 124 on client device 120. For example, BCO program 400 receives an additional model or sets of models when battery maintenance modeling program 108 determines that a pattern of behavior, of a user, is classified as a new behavior. BCO program 400 adds each set of models based on a new behavior pattern of a user to the library of battery maintenance models in file storage 124.

In step 409, BCO program 400 receives predicted behavior patterns for a user of client device 120 from battery usage analysis program 106. BCO program 400 subsequently stores the predicted behavior pattern of a user in file storage 124.

In step 410, BCO program 400 determines a polling rate that is applied to monitoring client device 120 and behaviors of the user of client device 120. The polling rate is the frequency at which BCO program 400 collects data from client device 120, battery 130, and sensors 132. Examples of data that BCO program 400 collects data from client device 120, battery 130, and sensors 132 are operational parameters, battery states, and environmental factors. Additionally, BCO program 400 polls client device 120 to collect data related to one or more behaviors associated with a user utilizing client device 120. User behaviors may include: when client device 120 is active, when a user activates specific programs, when the user utilizes client device 120 without a power adapter, when a user deactivates the display of client device 120 and utilizes and displays external to client device 120, etc. In one embodiment, the polling rate employed by BCO program 400 varies. In one scenario, BCO program 400 increases the polling rate whenever a user engages in a pattern of behavior that was not previously predicted by a model generated by battery usage analysis program 106. In another embodiment, BCO program 400 modifies the polling rate based on the intervention associated with a battery maintenance model.

In another embodiment, BOC program 400 monitors the behavior of a user of client device 120 at a fixed polling rate. In one scenario, BOC program 400 sets the polling rate to the same value each time client device 120 powers on. In another scenario, BOC program 400 sets the polling rate based on information determined in step 402 when BOC program 400 initializes. In some embodiments, BOC program 400 employs multiple polling rates. For example, BOC program 400 may set the value for a polling rate associated with one or more battery states determined in step 402. Subsequently, BOC program 400 sets different values for the polling rate associated with acquiring operational parameters (in step 402). BOC program 400 may set yet another value for a polling rate associated with monitoring behaviors of a user.

In other embodiments, DUP program 300 and BCO program 400 operate concurrently and may affect how polling rates are determined. In one scenario, BCO program 400 and DUP program 300 may synchronize polling rates for information common to BCO program 400 and DUP program 300. In another scenario, other factors determine whether polling rates determined by DUP program 300 take precedence over polling rates set by BCO program 400. For example, where models are initially developed, polling rates set by DUP program 300 take precedence over polling rates set by BCO program 400. Subsequently, when the models employed by BCO program 400 are stable, polling rates determined by BCO program 400 take precedence over polling rates determined by DUP program 300.

In step 412, BCO program 400 monitors behaviors of a user employing client device 120 and subsequently stores the behavioral data. In some embodiments, BCO program 400 stores the behavioral data of a user in file storage 124. In other embodiments, BCO program 400 periodically transmits the stored behavioral data of a user to server 102 for additional on-line learning and validation of likelihood algorithms that generate predicted behavior patterns of a user. User behaviors that are monitored include when a user connects to an external power adapter, which software a user executes at a specific time or date, which functions or peripherals that a user activates and when, a user activates client device 120, the duration that client device 120 is active, and the movement or location of client device 120.

In decision step 414, BCO program 400 compares the current behavior of a user to the predicted behavior patterns stored in file storage 124 on client device 120. If BCO program 400 determines that the current behavior of a user fits a predicted behavior pattern within a threshold or tolerance (yes branch, decision step 414), then BCO program 400 applies a battery maintenance model to client device 120 powered by battery 130.

In step 416, BCO program 400 applies a battery maintenance model to client device 120 powered by battery 130. The battery maintenance model is contained within at least one of the sets of battery maintenance models stored in file storage 124 on client device 120. BCO program 400 selects the battery maintenance model to apply to client device 120 based on the current behavior of a user, one or more states of battery 130, one or more environmental factors, one or more operational parameters, and the state of a current battery maintenance model (if a battery maintenance model is active on client device 120). In some embodiments, the states of battery 130, the one or more environmental factors, and the one or more operational parameters are stored in volatile storage (e.g., RAM). In other embodiments, the states of battery 130, the one or more environmental factors, and the one or more operational parameters are stored in persistent storage (e.g., file storage 124).

In one embodiment, BCO program 400 automatically performs at least one intervention action to client device 120, battery 130, or microcontroller 134. For example, BCO program 400 determines that the predicted pattern of behavior of a user indicates that client device 120 may remain powered on for at least three hours. BCO program 400 determines that the state of charge (SOC) of battery 130 is 100%. BCO program 400 also determines that microcontroller 134 cannot deactivate the trickle charge to battery 130. BCO program 400 selects a battery maintenance model that is configured to prevent overcharging battery 130 and related overheating of battery 130. Based on the coulombic efficiency of battery 130 and based on the predicted power drain associated with the predicted behavior of the user, BCO program 400 can turn off power supplied by the power adapter for two hours and have client device 120 be powered by battery 130 during that time. After two hours, BCO program 400 switches client device 120 to the power adapter, and battery 130 begins recharging. Based on the rate of charging, BCO program 400 determines that battery 130 may return to an SOC of 100% when the predicted behavior pattern of the user finishes.

Referring to step 416, in another embodiment, BCO program 400 notifies the user of client device 120, via UI 122, that to complete the intervention associated with a battery maintenance model (e.g., achieve a high level of compliance with a battery maintenance policy) that the user deviates from a current behavior pattern. For example, BCO program 400 determines that to comply with the current battery maintenance model that the BMS, within client device 120, completes a periodic calibration of the Coulomb counter within battery 130. BCO program 400 determines that the calibration of the Coulomb counter takes six hours and that the calibration of the Coulomb counter cannot occur while the discharge rate of battery 130 varies. BCO program 400 indicates to the user, via UI 122, to leave client device 120 idle for six hours while attached to the power adapter. Once BCO program 400 determines, via monitoring operational parameters, that no further user actions have occurred and that unneeded programs have been terminated, BCO program 400 proceeds with the intervention (e.g., the calibration of the Coulomb counter) for the next six hours.

In decision step 418, BCO program 400 determines whether client device 120 is in the process of shutting down. If BCO program 400 determines that client device 120 is active (no branch, decision step 418), then BCO program 400 loops to step 402 at a frequency dictated by a polling rate.

In decision step 418, if BCO program 400 determines that client device 120 is in the process of shutting down (yes branch, decision step 418), then BCO program 400 terminates executing. In one embodiment, BCO program 400 immediately terminates executing. In some embodiments, BCO program 400 may override the shutdown of client 120 by a user. For example, BCO program 400 overrides the shutdown to complete an intervention dictated by a battery maintenance model. In one scenario, BCO program 400 permits the operating system of client device 120 to terminate the execution of software (e.g., primary programs, support programs, background programs, some GUI functions, etc.) and functions (e.g., communication channels, display adapter, camera, etc.) not associated with an embodiment of the present invention. BCO program 400 subsequently completes the intervention in progress and permits the operating system to finish the shutdown of client device 120.

In another scenario, BCO program 400 instructs client device 120 to switch to a sleep or hibernate mode while the intervention associated with a battery maintenance model is executing. In one instance, once the intervention for battery 130 is complete, BCO program 400 may complete the shutdown process of client device 120. In another instance, once the intervention for battery 130 is complete, BCO program 400 may "wake up" (e.g., resume, restore, etc.) client device 120 and allow the operating system of client device 120 to complete the shutdown process of client device 120. In a different embodiment, BCO program 400 may offload the intervention in progress to microcontroller 134 within client device 120. BCO program 400 permits the operating system of client device 120 to shut down. In addition, hardware not associated with microcontroller 134 and the BMS controlling the actions of the intervention for battery 130 can be powered off.

Referring to decision step 414, if BCO program 400 determines that a predicted user behavior pattern did not occur (no branch decision step 414), then BCO program 400 determines an alternative user behavior pattern.

In step 420, BCO program 400 determines an alternate user behavior pattern based on the monitored user behavior (identified in step 412). In one embodiment, BCO program 400 analyzes the predicted behavior patterns of a user stored in file storage 124 and selects a different user behavior pattern to test prior to applying a battery maintenance model (in step 416). In another embodiment, BCO program 400 cannot determine an alternate user behavior pattern. BCO program 400 loops through the no branch of decision step 414 until DUP program 300 provides battery usage analysis program 106 sufficient information to predict another user behavior pattern that BCO program 400 subsequently receives in step 409.

Figure 5:
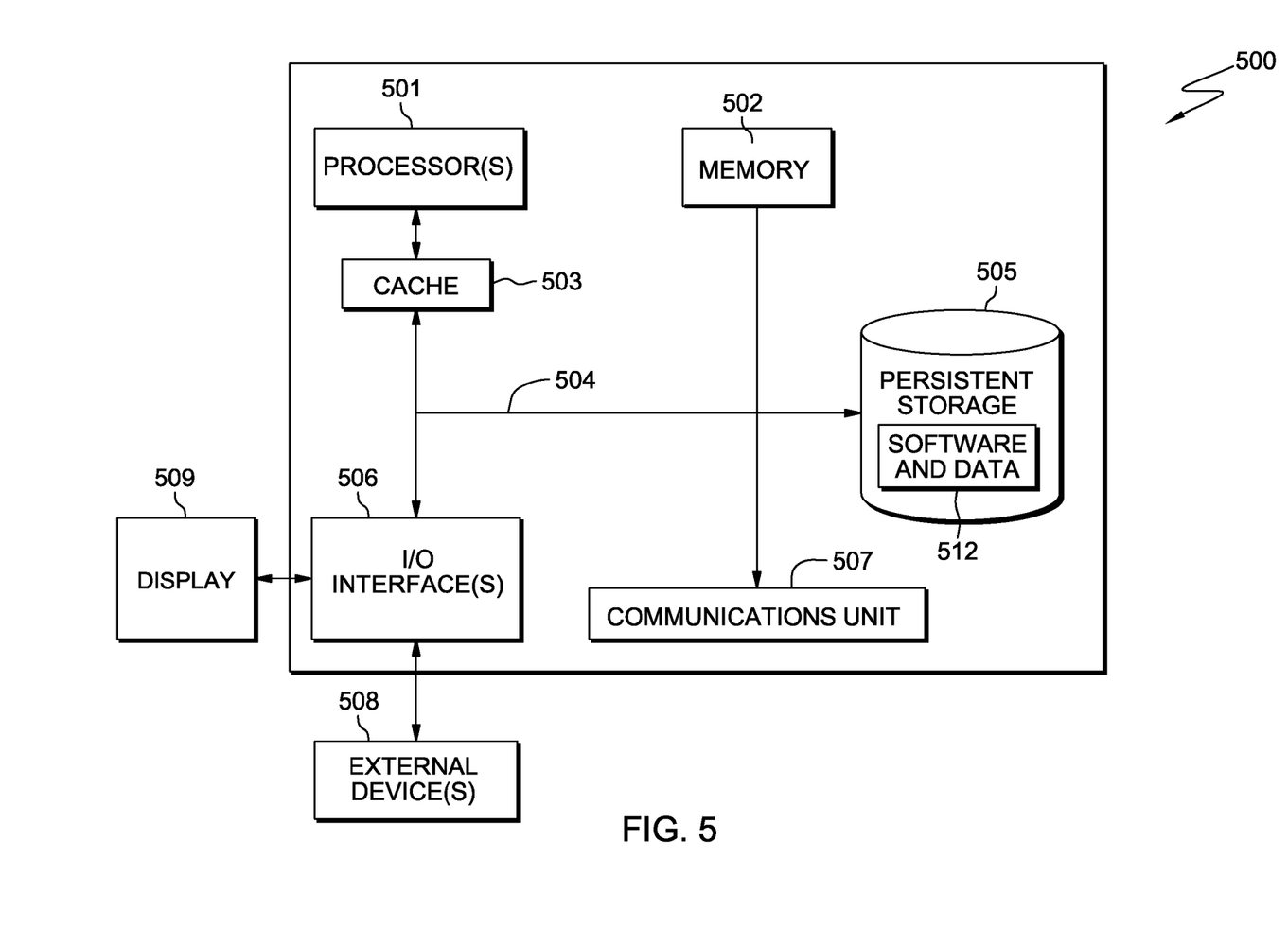
FIG. 5 is a block diagram of components of a computer, in accordance with an embodiment of the present invention.

FIG. 5 depicts computer system 500, which is representative of server 102 and client device 120. Computer system 500 is an example of a system that includes software and data 512. Computer system 500 includes processor(s) 501, cache 503, memory 502, persistent storage 505, communications unit 507, input/output (I/O) interface(s) 506, and communication fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processors 501 via cache 503 and one or more memories of memory 502. With respect to server 102, software and data 512 includes historical usage data 104, battery usage and analysis program 106, battery maintenance modeling program 108, and various programs (not shown). With respect to client device 120, software and data 512 includes user interface (UI) 122, file storage 124, battery identification application (app) 200, device usage profile (DUP) program 300, battery charging optimization (BCO) program 400, a web browser (not shown), and various programs (not shown).

Communications unit 507, in these examples, provides for communications with other data processing systems or devices, including resources of server 102 and client device 120. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display device 509.

Display device 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a rechargeable battery, the method comprising:
   identifying a rechargeable battery within a first device;
   identifying a battery maintenance policy associated with the rechargeable battery, wherein the battery maintenance policy is developed by a manufacturer of the identified rechargeable battery;
   determining a first set of models for implementing the identified battery maintenance policy on the identified rechargeable battery based on the identified battery maintenance policy and one or more environmental factors corresponding to the first device;
   installing the first set of models in the first device; and
   performing an intervention action based, at least in part, on a current state of the identified rechargeable battery, the first set of models, and one or more current environmental factors corresponding to the first device, wherein the intervention action is comprised of one or more of:
      restricting a recharging rate of the identified rechargeable battery based on a temperature of the identified rechargeable battery;

restricting a recharging rate of the identified rechargeable battery based on a pressure within cells of the identified rechargeable battery;

limiting a charge level of the rechargeable battery based on a period of time;

modifying one or more power management settings of the first device;

calibrating a battery management system included in the first device; and delaying the shutdown of the first device; and wherein environmental factors include: a temperature sensed by the first device, a barometric sensed by the first device, and a humidity sensed by the first device; and estimating a remaining lifespan of the identified rechargeable battery, wherein estimating the remaining lifespan of the identified rechargeable battery includes a probability of failure of the identified rechargeable battery within the first device and a time duration, and wherein estimating the remaining lifespan of the rechargeable battery further comprises:

determining the current state of the identified rechargeable battery within the first device;

determining a level of compliance demonstrated of the first device, based at least in part on the first set models of the identified battery maintenance policy and a completion of the intervention action; and comparing the level of compliance demonstrated by the first device to one or more relative levels of compliance of other instances of the rechargeable battery utilized by devices of other users and the corresponding maximum lifespan of the other instances of the rechargeable battery in the devices of the other users.

* * * * *